(12) United States Patent
Bergman et al.

(10) Patent No.: US 11,526,684 B2
(45) Date of Patent: Dec. 13, 2022

(54) METHODS AND APPARATUSES FOR REMOVING A SECURITY TAG

(71) Applicant: Sensormatic Electronics. LLC, Boca Raton, FL (US)

(72) Inventors: Adam S. Bergman, Boca Raton, FL (US); Manuel A. Soto, Lake Worth, FL (US); Steve E. Trivelpiece, Irvine, CA (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 0 days.

(21) Appl. No.: 17/014,482

(22) Filed: Sep. 8, 2020

(65) Prior Publication Data

US 2021/0103707 A1 Apr. 8, 2021

Related U.S. Application Data

(60) Provisional application No. 62/912,570, filed on Oct. 8, 2019.

(51) Int. Cl.
| | | |
|---|---|---|
| *G06K 7/08* | (2006.01) |
| *G06K 7/10* | (2006.01) |
| *G07C 9/29* | (2020.01) |
| *G06K 19/07* | (2006.01) |
| *E05B 73/00* | (2006.01) |
| *G08B 13/24* | (2006.01) |

(52) U.S. Cl.
CPC ...... *G06K 7/10366* (2013.01); *E05B 73/0017* (2013.01); *G06K 19/0723* (2013.01); *G07C 9/29* (2020.01); *G08B 13/2411* (2013.01); *G08B 13/2434* (2013.01)

(58) Field of Classification Search
CPC .. G06K 7/10366; G06K 19/0723; G07C 9/29; E05B 73/0017
USPC ....................................................... 235/451
See application file for complete search history.

(56) References Cited

U.S. PATENT DOCUMENTS 9,460,597 B1 10/2016 Clark et al.
2012/6161933 6/2012 Shin et al.
(Continued)

FOREIGN PATENT DOCUMENTS

EP 3038066 A1 6/2016

OTHER PUBLICATIONS

International Search Report and Written Opinion for International Patent Application No. PCT/US2020/054039, dated Mar. 12, 2021 (18 pages).

*Primary Examiner* — Ahshik Kim
(74) *Attorney, Agent, or Firm* — ArentFox Schiff LLP

(57) ABSTRACT

Aspects of the present disclosure include methods, systems, and non-transitory computer readable media for receiving a confirmation signal to unlock the security tag being detachably locked to a merchandise, wherein the confirmation signal includes a RFID device identifier associated with a RFID device of the security tag, and the RFID device is associated with a wireless device of the security tag, identifying the wireless device associated with the RFID device based on the RFID device identifier, transmitting a wireless signal to the wireless device to enable a controller to receive a release signal used to unlock the security tag from the merchandise, and transmitting the release signal to the controller to unlock the security tag from the merchandise.

19 Claims, 10 Drawing Sheets

(56) References Cited

U.S. PATENT DOCUMENTS

| | | | |
|---|---|---|---|
| 2013/0110657 A1* | 5/2013 | Forster | G06Q 20/208 |
| | | | 705/17 |
| 2016/0110571 A1 | 4/2016 | Jung et al. | |
| 2016/0260302 A1* | 9/2016 | Ellers | G08B 13/2434 |
| 2016/0260303 A1 | 9/2016 | Strulovitch et al. | |
| 2016/0321894 A1 | 11/2016 | Schneider | |
| 2016/0351034 A1 | 12/2016 | Trivelpiece et al. | |
| 2017/0053506 A1 | 2/2017 | Mexis | |
| 2017/0178477 A1* | 6/2017 | Turgeon | G08B 13/2405 |
| 2018/0334836 A1* | 11/2018 | Miller | E05B 73/0052 |
| 2020/0285821 A1* | 9/2020 | Chandramowle | G06K 7/10297 |
| 2021/0065525 A1* | 3/2021 | Soto | G08B 13/2417 |

* cited by examiner

METHODS AND APPARATUSES FOR REMOVING A SECURITY TAG

CROSS-REFERENCE TO RELATED APPLICATION

The current application claims priority to U.S. Provisional Application No. 62/912,570, filed on Oct. 8, 2019, entitled "System and Method for Using Low Frequency Wireless Communications to Detach a Security Tag from an Article Using a Detaching Pad," the contents of which are incorporated by reference by their entireties.

BACKGROUND

In an retail environment, lost, stolen, or misplaced merchandises may result in loss revenue for the store. As a counter measure, retail stores may place security tags on merchandises to prevent loss. The security tags may be removed only after the completion of a purchase to allow a customer that purchased a merchandise to properly exit the retail store. However, after the completion of the purchase, the security tags may require manual removal, which may be time-consuming and/or prone to error. Further, the removal process of a security tag associated with a purchased merchandise may cause unintended removal of other security tags (associated with unpurchased merchandises) in the vicinity of the security tag associated with the purchased merchandise. Therefore, improvements in tag removal may be desirable.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

Aspects of the present disclosure include methods, systems, and non-transitory computer readable media that receive a confirmation signal to unlock the security tag being detachably locked to a merchandise, wherein the indication includes a RFID device identifier associated with a RFID device, and the RFID device is associated with a wireless device of the security tag, identify the wireless device associated with the RFID device based on the RFID device identifier, transmit a wireless signal to the wireless device to enable the RFID device to receive a RFID signal used to unlock the security tag from the merchandise, and transmit the RFID signal to the RFID device to unlock the security tag from the merchandise.

An aspect of the present disclosure includes a method including receiving a confirmation signal to unlock the security tag being detachably locked to a merchandise, wherein the indication includes a RFID device identifier associated with a RFID device, and the RFID device is associated with a wireless device of the security tag, identifying the wireless device associated with the RFID device based on the RFID device identifier, transmitting a wireless signal to the wireless device to enable the RFID device to receive a RFID signal used to unlock the security tag from the merchandise, and transmitting the RFID signal to the RFID device to unlock the security tag from the merchandise.

Aspects of the present disclosure includes a scanner having a RFID device, a wireless device, a memory that stores instructions, and a processor configured to execute the instructions to receive a confirmation signal to unlock the security tag being detachably locked to a merchandise, wherein the indication includes a RFID device identifier associated with the RFID device, and the RFID device is associated with a wireless device of the security tag, identify the wireless device associated with the RFID device based on the RFID device identifier, transmit a wireless signal to the wireless device to enable the RFID device to receive a RFID signal used to unlock the security tag from the merchandise, and transmit the RFID signal to the RFID device to unlock the security tag from the merchandise.

Certain aspects of the present disclosure includes a non-transitory computer readable medium having instructions stored therein that, when executed by a processor, cause the processor to receive a confirmation signal to unlock the security tag being detachably locked to a merchandise, wherein the indication includes a RFID device identifier associated with a RFID device, and the RFID device is associated with a wireless device of the security tag, identify the wireless device associated with the RFID device based on the RFID device identifier, transmit a wireless signal to the wireless device to enable the RFID device to receive a RFID signal used to unlock the security tag from the merchandise, and transmit the RFID signal to the RFID device to unlock the security tag from the merchandise.

Aspects of the present disclosure include methods, security tags, and non-transitory computer readable media that receive a wireless signal to enable a RFID device of the security tag to receive a RFID signal used to detach the security tag from a merchandise, send an enablement signal, in response to receiving the wireless signal, to the RFID device to receive the RFID signal, receives the RFID signal, generate an unlocking signal, in response to receiving the RFID signal, for unlocking a lock mechanism of the security tag, wherein a first electrical energy of the unlocking signal is derived from at least a portion of a second electrical energy of the RFID signal, send an unlocking signal to the lock mechanism to detach the security tag from the merchandise.

Aspects of the present disclosure include methods, RFID scanners, and non-transitory computer readable media for receiving a confirmation signal to unlock the security tag being detachably locked to a merchandise, wherein the confirmation signal includes a RFID device identifier associated with a RFID device of the security tag, and the RFID device is associated with a wireless device of the security tag, identifying the wireless device associated with the RFID device based on the RFID device identifier, transmitting a wireless signal to the wireless device to enable a controller to receive a release signal used to unlock the security tag from the merchandise, and transmitting the release signal to the controller to unlock the security tag from the merchandise.

Aspects of the present disclosure include methods, security tags, and non-transitory computer readable media for receiving a wireless signal to enable a controller of the security tag to receive a release signal used to detach the security tag from a merchandise, sending an enablement signal, in response to receiving the wireless signal, to the controller to receive the release signal, receiving the release signal, generating an unlocking signal, in response to receiving the release signal, for unlocking a lock mechanism of the security tag, wherein a first electrical energy of the unlocking signal is derived from at least a portion of a second electrical energy of the release signal, and sending an unlocking signal to the lock mechanism to detach the security tag from the merchandise.

Aspects of the present disclosure include methods, security tags, and non-transitory computer readable media for receiving a release signal having a signal waveform, determining whether the signal waveform is substantially identical to a predetermined waveform, generating an unlocking signal, in response to determining that the signal waveform is substantially identical to the predetermined waveform, for unlocking a lock mechanism of the security tag, wherein a first electrical energy of the unlocking signal is derived from at least a portion of a second electrical energy of the release signal, and sending an unlocking signal to the lock mechanism to detach the security tag from the merchandise.

BRIEF DESCRIPTION OF THE DRAWINGS

The features believed to be characteristic of aspects of the disclosure are set forth in the appended claims. In the description that follows, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advantages thereof, will be best understood by reference to the following detailed description of illustrative aspects of the disclosure when read in conjunction with the accompanying drawings, wherein:

DETAILED DESCRIPTION

The following includes definitions of selected terms employed herein. The definitions include various examples and/or forms of components that fall within the scope of a term and that may be used for implementation. The examples are not intended to be limiting.

In some aspects of the present disclosure, a security tag may include a radio frequency identification (RFID) device and a wireless device (e.g., a Bluetooth, a Wireless Fidelity (Wi-Fi), or a Near Field Communication (NFC) device). The RFID device may be associated with the wireless device. For example, a hardware address of the RFID device may be associated with the hardware address of the wireless device. The association may be performed prior to using the security tag.

In certain implementations, the security tag may be utilized to deter retail loss. For example, staff of a retail store may lock the security tag to a merchandise. After a customer purchases the merchandise, the security tag may be removed from the merchandise. In an aspect of the present disclosure, the removal system may be connected and in communication with a purchase system. After the customer purchases the merchandise, the purchase system may transmit a confirmation signal to the removal system indicating the purchase. The removal system may transmit a wireless signal to the wireless device of the security tag to unlock the security tag from the merchandise. The removal system may transmit a release signal to the controller to energize the security tag. The wireless signal and the release signal may cause the security tag to unlock from the merchandise.

Figure 1:
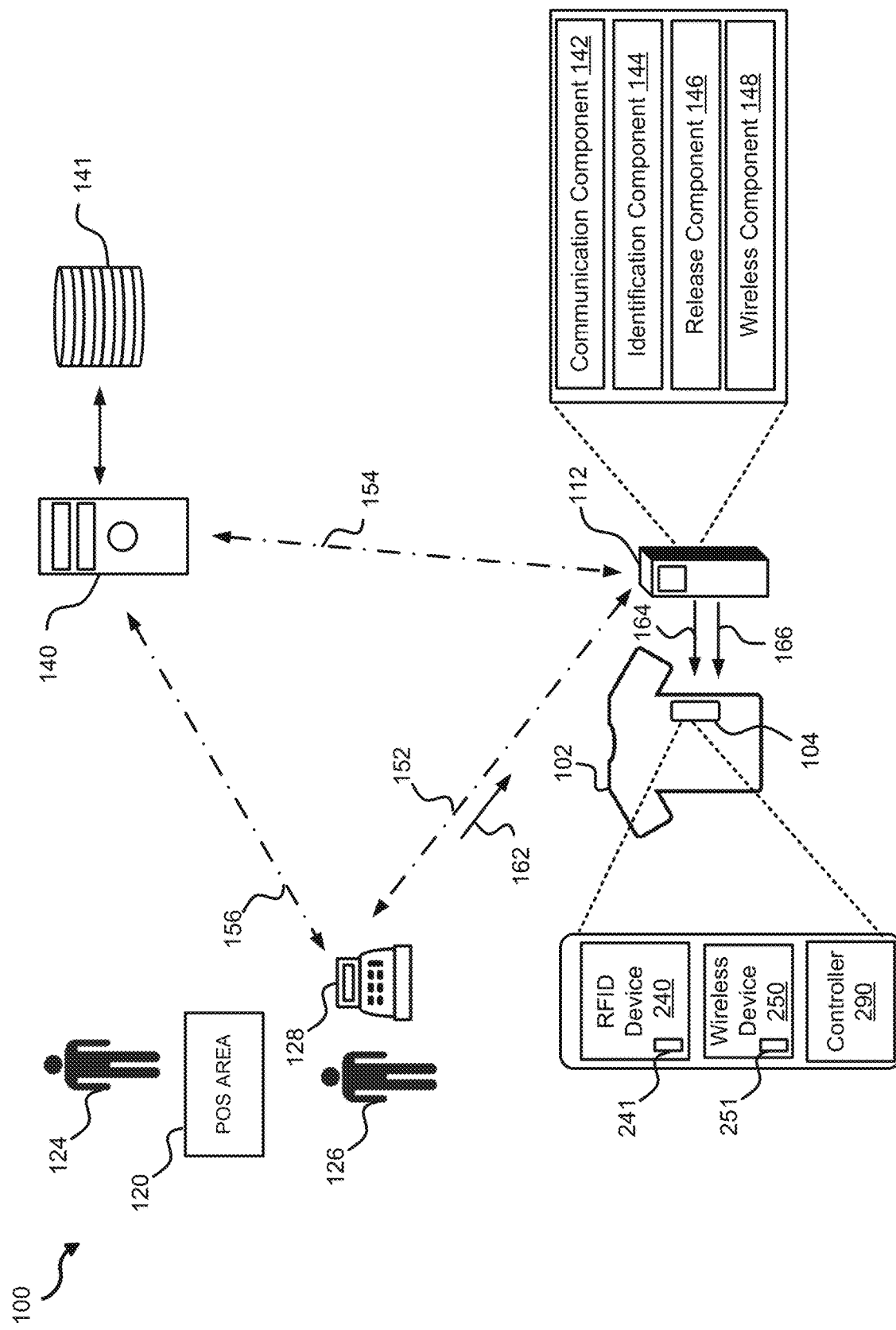
FIG. 1 illustrates an example of an environment for implementing a security tag removal process in accordance with aspects of the present disclosure.

Referring to FIG. 1, in a non-limiting implementation, an example of an environment 100 (e.g., a retail store) for loss prevention according to aspects of the present disclosure. The environment may include a merchandise 102 having a security tag 104 attached to the merchandise 102. The security tag 104 may be locked (e.g., unable to be removed from the merchandise 102 without damaging the merchandise 102) to prevent unauthorized removal from the merchandise 102. The security tag 104 may include a RFID device 240 configured to transmit and/or receive RFID signals. The security tag 104 may include a wireless device 250 configured to transmit and/or receive wireless signals (e.g., Bluetooth, Wi-Fi, NFC, etc.). The RFID device 240 may include a RFID device identifier 241. The wireless device 250 may include a wireless device identifier 251. The security tag 104 may include a controller 290.

In certain implementations, the environment 100 may include a cash register 128 operating in a point-of-sale (POS) area 120. The cash register 128 may complete a sale associated with the merchandise 102. The cash register 128 may transmit a signal to a server 140 indicating the completion of the sale associated with the merchandise 102.

In some implementations, the environment 100 may include the server 140 and an optional data repository 141. The server 140 may communicate with the RFID scanner 112 and/or the cash register 128 via communication links 154, 156. The communication links 154, 156 may be wired or wireless communication channels.

In one aspect of the present disclosure, the environment 100 may include a RFID scanner 112 configured to transmit and/or receive RFID signals. The RFID scanner 112 may include a communication component 142 configured to communicate with the server 140 via the communication link 154 and/or the cash register 128 via the communication link 152. The RFID scanner 112 may include an identification component 144 configured to identify a wireless device associated with a RFID device. The RFID scanner 112 may include a release component 146 that transmits and/or receives release signals to the security tag 104. The RFID scanner 112 may include a wireless component 148 that transmits and/or receives wireless signals to and/or from the wireless device 250 of the security tag 104. One or more of the communication component 142, the identification component 144, the release component 146, and/or the wireless component 148 may be configured as hardware (e.g., application specific integrated circuit, application processors, field programmable gate arrays, etc.), software (e.g., instructions stored in a memory executed by a processor of the RFID scanner 112), or a combination thereof. The controller 290 may be configured to transmit unlocking signals and/or receive releasing signals used to unlock the security tag 104.

During operation, prior to a retail transaction, the RFID device 240 of the security tag 104 may be associated with the wireless device 250 of the security tag. In an implementation, the RFID device identifier 241 may be associated with the wireless device identifier 251. For example, a RFID hardware address of the RFID device 240 or a portion of the RFID hardware address may be associated with a wireless hardware address of the wireless device 250 or a portion of the wireless hardware address. In another implementation, a serial number or a portion of the serial number of the RFID device 240 may be associated with a serial number or a portion of the serial number of the wireless device 250. The association may be stored in the server 140 and/or the optional data repository 141. The RFID hardware address may be stored in the RFID device 240 (or a memory in the RFID device 240). The wireless hardware address may be stored in the wireless device 250 (or a memory in the wireless device 250). The serial numbers of the RFID device 240 and/or the wireless device 250 may be displayed on the security tag 104. The hardware addresses and/or serial numbers may be alphanumeric strings. In alternative examples, the server 140 may perform a mathematic function (e.g., hash function) to the RFID device identifier 241 and/or the wireless device identifier 251, and associate the results.

In alternative implementations, the RFID device identifier 241 may be associated with a release signal 166. For example, the release signal 166 may include a particular waveform. The RFID device identifier 241 may be associated with the release signal 166. The controller 290 may only unlock the security tag 104 in response to receiving the release signal 166 from the RFID scanner 112. Other signals transmitted to the controller 290 may not unlock the security tag 104.

In an implementation, the security tag 104 may be attached to the merchandise 102. The attachment may include a lock mechanism (described below) that prevents unauthorized detachment of the security tag 104 from the merchandise 102. The security tag 104 may prevent and/or deter unauthorized removal of the merchandise 102 from the environment 100.

In some implementations, a customer 124 may attempt to purchase the merchandise 102. The merchandise 102 may be attached to the security tag 104. For example, the cash register 128 may receive price identification information (e.g., bar code scanned by the cash register 128 or price tag input by the clerk 126 and/or the customer 124) associated with the merchandise 102. In response, the cash register 128 may present a price of the merchandise 102 to the customer 124. The cash register 128 may receive payment (e.g., credit card, cash, or check) from the customer 124.

In certain implementations, the RFID scanner 112 may transmit an interrogating signal to the RFID device 240. In response, the RFID scanner 112 may receive a response signal including the RFID device identifier 241 (e.g., the RFID hardware address or the RFID serial number). The RFID scanner 112 may transmit the RFID device identifier 241 to the cash register 128 via the communication link 152. In response to receiving the RFID device identifier 241, the cash register 128 may associate the sale of the merchandise 102 with the RFID device identifier 241.

In some variations, the cash register may transmit a confirmation signal 162 to the RFID scanner 112. The RFID scanner 112 may receive the confirmation signal 162 from the cash register 128 via the communication link 152 and/or from the server via the communication link 156. The confirmation signal 162 may include some or all of the following information: merchandise information of the merchandise 102, the RFID device identifier 241, an indication to unlock the security tag 104 from the merchandise, etc.

In a non-limiting implementation, the RFID scanner 112 may identify the wireless device 250 associated with the RFID device 240 based on the RFID device identifier 241. For example, the RFID scanner 112 may transmit the RFID device identifier 241 to the server 140 via the communication link 154. The server 140 may retrieve the association between the RFID device 240 and the wireless device 250, via the RFID device identifier 241, and transmit the wireless device identifier 251 to the RFID scanner 112. In another example, RFID scanner 112 may locally store (in a memory) the association between the RFID device 240 and the wireless device 250. The RFID scanner 112 may retrieve the wireless device identifier 251 from the memory.

In one aspect of the present disclosure, the RFID scanner 112 may transmit a wireless signal 164 to the wireless device 250 of the security tag 104 based on the RFID device identifier 241 and/or the retrieved wireless device identifier 251. The wireless signal 164 may indicate to the wireless device 250 to enable a controller to receive a subsequently and/or concurrently transmitted a release signal 168 used to unlock the security tag 104 from the merchandise 102. The wireless signal 164 may be encrypted. For example, the wireless signal 164 may be encrypted with symmetric or asymmetric encryption. The wireless signal 164 may be encrypted with advanced encryption standard (AES) algorithm, data encryption standard (DES) algorithm, MD5 encryption algorithm, or other suitable encryption algorithms.

In some aspects, an unlock signal transmitter 260 may transmit a release signal 166 to the security tag 104 to unlock the security tag 104 from the merchandise. The release signal 166 may be a low frequency signal (e.g., below 1 megahertz). The energy in the release signal 166 may be utilized by the security tag 104 for the unlock operation. The release signal 166 may be encrypted. For example, the release signal 166 may be encrypted with symmetric or asymmetric encryption. The release signal 166 may be encrypted with advanced encryption standard (AES) algorithm, data encryption standard (DES) algorithm, MD5 encryption algorithm, or other suitable encryption algorithms.

Figure 2:
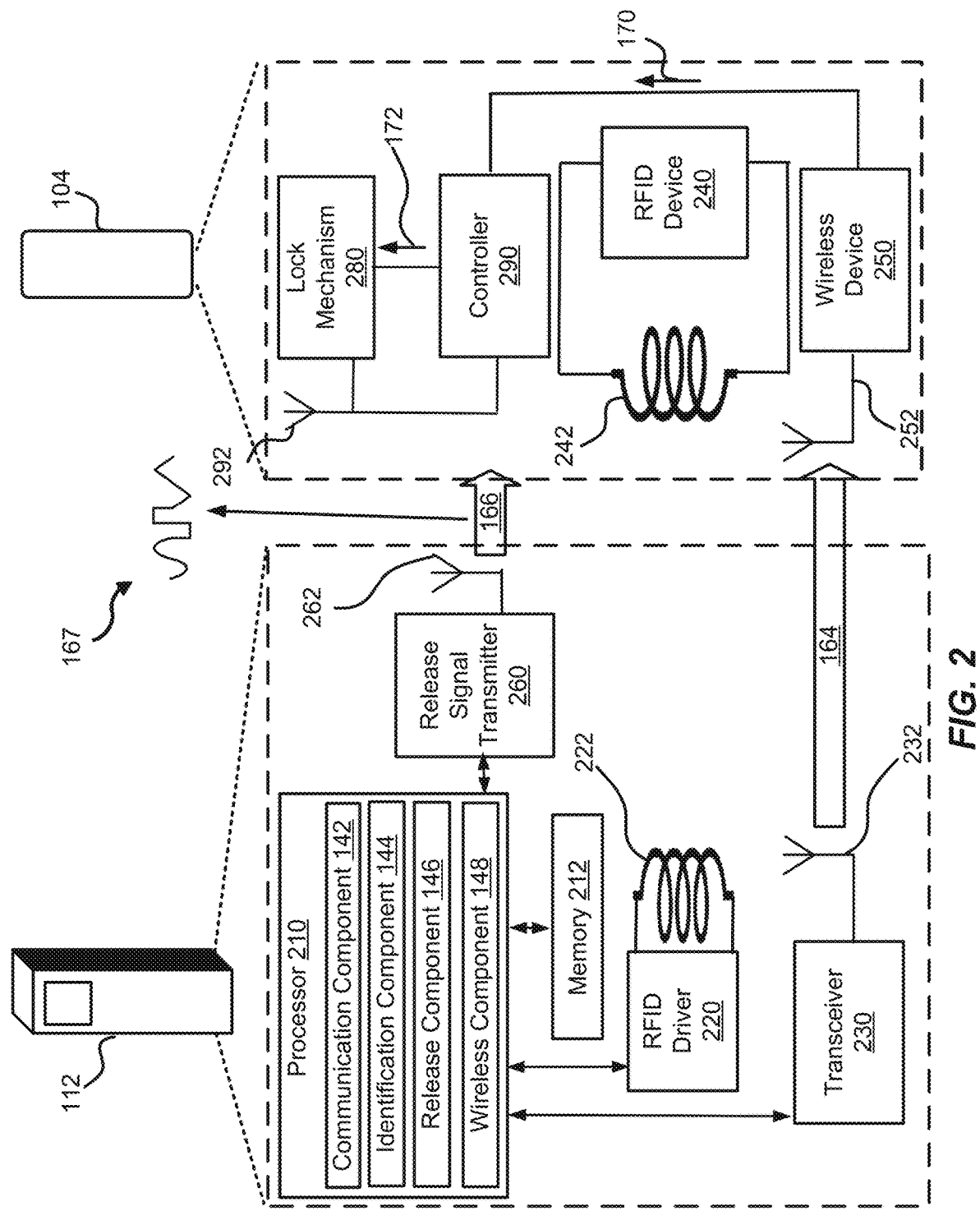
FIG. 2 illustrates an example of a radio frequency identification (RFID) scanner and a security tag in accordance with aspects of the present disclosure.

Referring to FIGS. 1 and 2, an example of the RFID scanner 112 may be configured to transmit the wireless signal 164 and/or the release signal 166 to the security tag 104. The RFID scanner 112 may include a processor 210 that executes instructions stored in a memory 212 for performing the unlocking functions described herein.

The term "processor," as used herein, can refer to a device that processes signals and performs general computing and arithmetic functions. Signals processed by the processor can include digital signals, data signals, computer instructions, processor instructions, messages, a bit, a bit stream, or other computing that can be received, transmitted and/or detected. A processor, for example, can include microprocessors, controllers, digital signal processors (DSPs), field programmable gate arrays (FPGAs), programmable logic devices (PLDs), state machines, gated logic, discrete hardware circuits, and other suitable hardware configured to perform the various functionality described herein. The term "memory," as used herein, can include volatile memory and/or nonvolatile memory. Non-volatile memory can include, for example, ROM (read only memory), PROM (programmable read only memory), EPROM (erasable PROM) and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM).

The term "memory," as used herein, can include volatile memory and/or nonvolatile memory. Non-volatile memory can include, for example, ROM (read only memory), PROM (programmable read only memory), EPROM (erasable PROM) and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM).

In some implementations, the RFID scanner 112 may include the memory 212.

The RFID scanner 112 may include a RFID driver 220 configured to transmit and/or receive RFID signals via a scanner coil 222. The RFID scanner 112 may include a transceiver 230 configured to transmit and/or receive wireless signals via a scanner antenna 232. The RFID scanner 112 may include a release signal transmitter 260 configured to transmit the release signal 166 via a release signal antenna 262.

The processor 210 may cause the RFID driver 220 to transmit RFID signals, via a scanner coil 222, to the security tag 104. The RFID driver 220 may energize the scanner coil 222 to transmit the release signal 166. The scanner coil 222 may include one or more inductors that transmit or receive electromagnetic signals. The processor 210 may include the release component 146 that causes the release signal transmitter 260 to transmit the release signal 166, via the release signal antenna 262, to the security tag 104. The processor 210 may include the wireless component 148 that causes the transceiver 230 to transmit wireless signals via the scanner antenna 232.

Additionally, in some non-limiting examples, the security tag 104 may include the RFID device 240 that transmits and/or receives RFID signals via a tag coil 242. The security tag 104 may include the wireless device 250 that transmits and/or receives wireless signals via a tag antenna 252. The security tag 104 may include a lock mechanism 280 that securely fastens the security tag 104 to the merchandise 102.

During operation, in some implementations, the processor 210, the memory 212, the wireless component 148, the transceiver 230, and/or the scanner antenna 232 may receive the confirmation signal 162 from the cash register 128 and/or the server 140. The confirmation signal 162 may include an indication to unlock the security tag 104 to detach from the merchandise 102. The confirmation signal 162 may include the RFID device identifier 241. Alternatively or additionally, after receiving the confirmation signal 162, the RFID driver 220 may transmit an interrogating signal to the RFID device 240 to receive a response signal including the RFID device identifier 241.

In some instances, in response to receiving the confirmation signal 162, the processor 210, the memory 212, the identification component 144, the wireless component 148, the transceiver 230, and/or the scanner antenna 232 may identify the wireless device 250 associated with the RFID device 240. In one implementation, the processor 210, the memory 212, the wireless component 148, the transceiver 230, and the scanner antenna 232 may transmit a request to the server 140 via the communication link 154. The request may include the RFID device identifier 241. The server 140 may identify the wireless device identifier 251 associated with the RFID device identifier 241. In response, the server 140 may transmit a response to the RFID scanner 112 including the wireless device identifier 251 associated with wireless device 250. The RFID scanner 112 may identify the wireless device 250 based on the wireless device identifier 251. In another implementation, the memory 212 of the RFID scanner 112 may store the association between the RFID device identifier 241 and the wireless device identifier 251. The processor 210 and the memory 212 may identify the wireless device identifier 251 stored in the memory 212 based on the RFID device identifier 241. The RFID scanner 112 may identify the wireless device 250 based on the wireless device identifier 251. Other methods of identifying the wireless device 250 are possible.

In an implementation, the processor 210, the memory 212, the wireless component 148, the transceiver 230, and/or the scanner antenna 232 may transmit the wireless signal 164 to the tag antenna 252 of the security tag 104. In response to receiving the wireless signal 164, the wireless device 250 may transmit an enablement signal 170 to enable the controller 290 and/or the lock mechanism 280 to receive the release signal 166 to unlock the lock mechanism 280.

In some implementations, the processor 210, the memory 212, the release component 146, and/or the release signal antenna 262 may transmit the release signal 166 to the lock antenna 292 of the security tag 104. In response to receiving the wireless signal 164 prior to receiving the release signal 166, the controller 290 may transmit an unlocking signal 172 to the lock mechanism 280. The controller 290 may utilize the electrical energy in the release signal 166 to generate the unlocking signal 172. In certain implementations, the release signal 166 may be a direct current signal or an alternative current signal. The controller 290 may be configured as one or more microprocessors, controllers, digital signal processors (DSPs), field programmable gate arrays (FPGAs), programmable logic devices (PLDs), state machines, gated logic, discrete hardware circuits, and other suitable hardware.

In some implementations, the controller 290 may be unable to receive the release signal 166 without receiving the wireless signal 164 beforehand. In other implementations, the controller 290 may be able to receive the release signal 166 without receiving the wireless signal 164, but unable to transmit the unlocking signal 172 without receiving the wireless signal 164 beforehand.

In alternative implementations, the controller 290 may receive release signal 166 only if a waveform 167 of the release signal 166 is substantially identical to a predetermined waveform. In such instances, the processor 210, the memory 212, the release component 146, and/or the release signal antenna 262 may transmit the release signal 166 with the waveform 167 (e.g., amplitude pattern, frequency pattern, phase pattern, modulation, encoding, encryption, etc.). The controller 290 may determine that the waveform 167 of the release signal 166 is substantially identical to the pre-determine waveform. As a result, the controller 290 may transmit the unlocking signal 172 to the lock mechanism 280 for unlocking.

Figure 3:
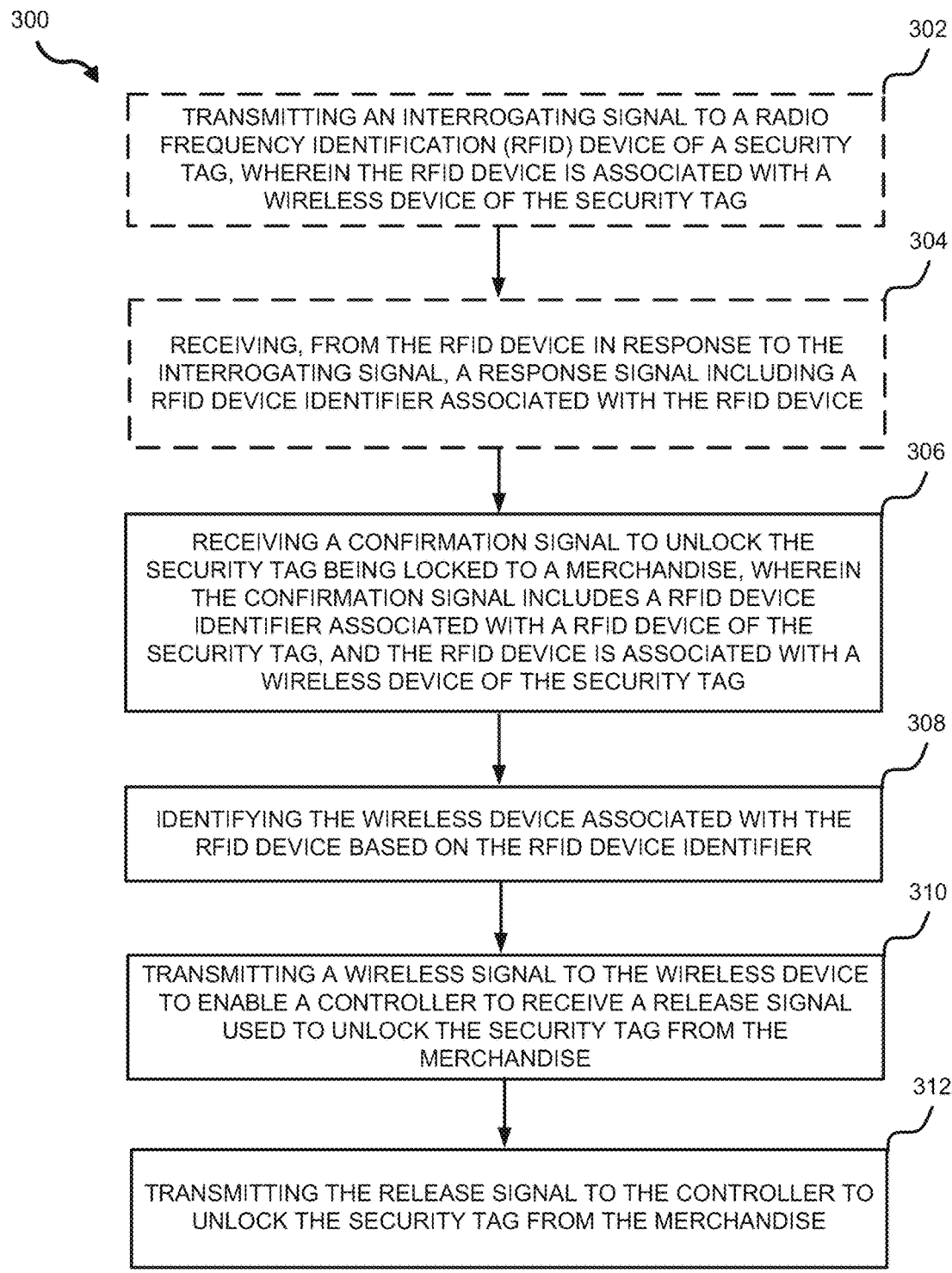
FIG. 3 illustrates an example of a method for transmitting a RFID signal to remove a security tag in accordance with aspects of the present disclosure.

Turning to FIG. 3, an example of a method 300 for unlocking a security tag may be performed by the RFID scanner 112 and/or one or more of the communication component 142, the identification component 144, the release component 146, and/or the wireless component 148.

At block 302, the method 300 may optionally transmit an interrogating signal to a radio frequency identification (RFID) device of a security tag, wherein the RFID device is associated with a wireless device of the security tag. For example, the processor 210, the memory 212, the release component 146, the RFID driver 220, and/or the scanner coil 222 may transmit an interrogating signal to the RFID device 240 of the security tag as described above. The processor 210, the memory 212, the release component 146, the RFID driver 220, and/or the scanner coil 222 may be configured to and/or define means for transmitting an interrogating signal to a radio frequency identification (RFID) device of a security tag, wherein the RFID device is associated with a wireless device of the security tag.

At block 304, the method 300 may optionally receive, from the RFID device in response to the interrogating signal, a response signal including a RFID device identifier associated with the RFID device. For example, the processor 210, the memory 212, the release component 146, the RFID driver 220, and/or the scanner coil 222 may receive, from the RFID device 240 in response to the interrogating signal, a response signal including the RFID device identifier 241 associated with the RFID device 240 as described above. The processor 210, the memory 212, the release component 146, the RFID driver 220, and/or the scanner coil 222 may be configured to and/or define means for receiving, from the RFID device in response to the interrogating signal, a response signal including a RFID device identifier associated with the RFID device.

In certain implementations, the RFID scanner 112 may transmit RFID device identifier to the cash register 128 to identify the security tag 104 attached to the merchandise 102.

At block 306, the method 300 may receive a confirmation signal to unlock the security tag being locked to a merchandise, wherein the confirmation signal includes the RFID device identifier associated with the RFID device. For example, the processor 210, the memory 212, the communication component 142, the wireless component 148, the transceiver 230, and/or the scanner antenna 232 may receive the confirmation signal 162 indicating a confirmation of the sale of the merchandise 102 as described above. The confirmation signal 162 may include the RFID device identifier 241. The confirmation signal 162 may indicate to the RFID scanner 112 to unlock the security tag 104. The processor 210, the memory 212, the communication component 142, the wireless component 148, the transceiver 230, and/or the scanner antenna 232 may be configured to and/or define means for receiving a confirmation signal to unlock the security tag being locked to a merchandise, wherein the indication includes the RFID device identifier associated with the RFID device At block 308, the method 300 may identify the wireless device associated with the RFID device based on the RFID device identifier. For example, the processor 210, the memory 212, the communication component 142, the identification component 144, the wireless component 148, the transceiver 230, and/or the scanner antenna 232 may identify the wireless device 250 associated with the RFID device 240 based on the RFID device identifier 241 as described above. The processor 210, the memory 212, the communication component 142, the identification component 144, the wireless component 148, the transceiver 230, and/or the scanner antenna 232 may be configured to and/or define means for identifying the wireless device associated with the RFID device based on the RFID device identifier.

At block 310, the method 300 may transmit a wireless signal to the wireless device to enable device controller to receive a release signal used to unlock the security tag from the merchandise. For example, the processor 210, the memory 212, the communication component 142, the wireless component 148, the transceiver 230, and/or the scanner antenna 232 may transmit the wireless signal 164 to the wireless device 250 to enable the controller 290 to receive the release signal 166 used to unlock the security tag 104 from the merchandise 102. The processor 210, the memory 212, the communication component 142, the wireless component 148, the transceiver 230, and/or the scanner antenna 232 may be configured to and/or define means for transmitting a wireless signal to the wireless device to enable the controller to receive a release signal used to unlock the security tag from the merchandise.

At block 312, the method 300 may transmit the release signal to the controller to unlock the security tag from the merchandise. For example, the processor 210, the memory 212, the release component 146, the release signal transmitter 260, and/or the release signal antenna 262 may transmit the release signal 166 to the controller 290 to unlock the security tag 104 from the merchandise 102. The processor 210, the memory 212, the release component 146, the release signal transmitter 260, and/or the release signal antenna 262 may be configured to and/or define means for transmitting the release signal to the controller to unlock the security tag from the merchandise.

In alternative implementations, the RFID scanner 112 may associate the RFID device 240 with the waveform 167 for the release signal 166. The release signal transmitter 260 may transmit the release signal 166, with the waveform 167, to the controller 290 and/or the lock mechanism 280 for unlocking the lock mechanism 280.

Figure 4:
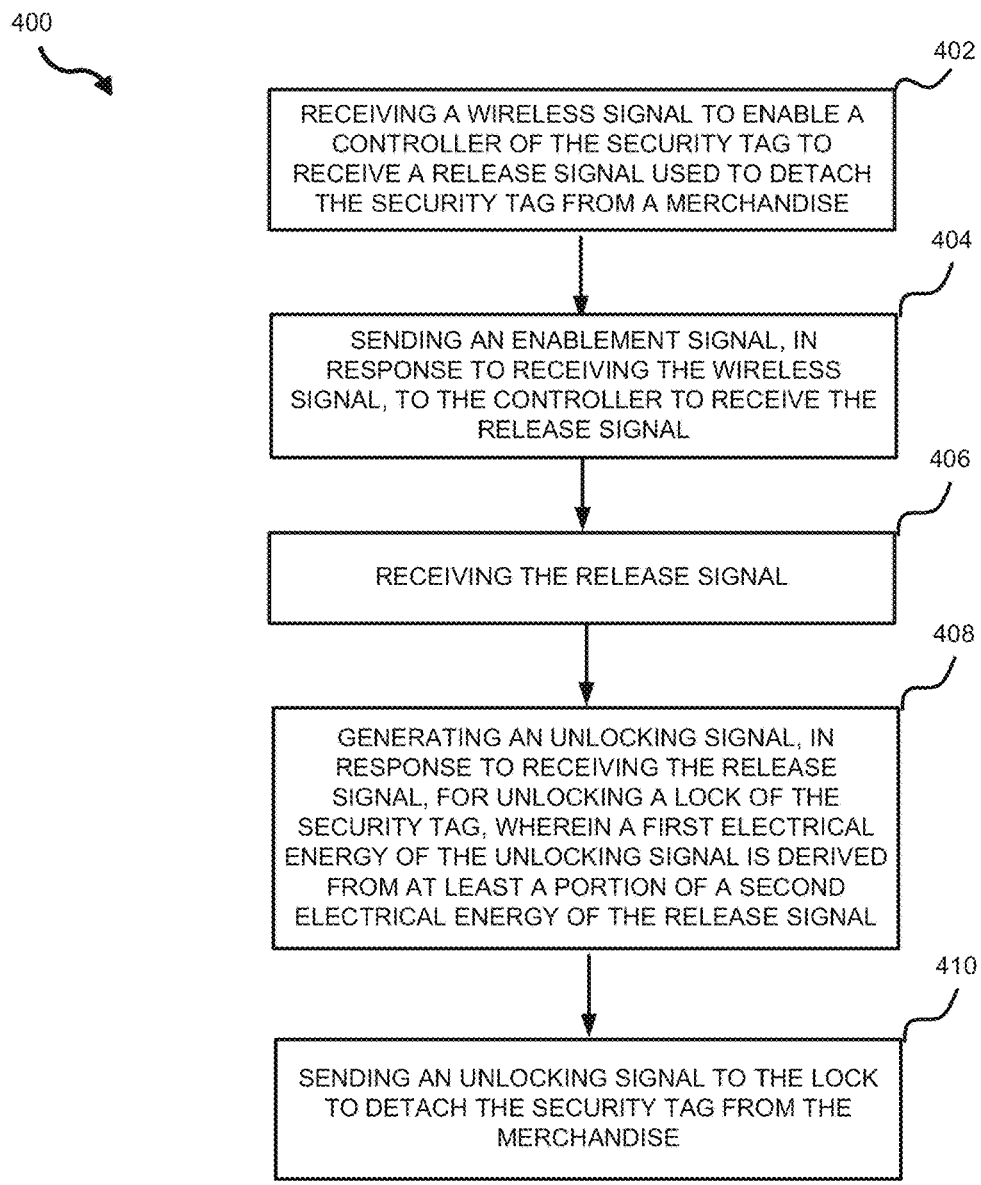
FIG. 4 illustrates an example of a method for removing a security tag in accordance with aspects of the present disclosure.

Turning to FIG. 4, an example of a method 400 for receiving release signal energy to unlock a security tag may be performed by the controller 290 and/or the wireless device 250.

At block 402, the method 400 may receive a wireless signal to enable a controller of the security tag to receive a release signal used to detach the security tag from a merchandise. For example, the wireless device 250 may receive the wireless signal 164 via the tag antenna 252 to enable the controller 290 of the security tag 104 to receive the release signal 166. The wireless device 250 and/or the tag antenna 252 may be configured to and/or define means for receiving a wireless signal to enable a controller of the security tag to receive a release signal used to detach the security tag from a merchandise.

At block 404, the method 400 may send an enablement signal, in response to receiving the wireless signal, to the controller to receive the release signal. For example, the wireless device 250 may send the enablement signal 170 to the controller 290 to receive the release signal 166. The wireless device 250 may be configured to and/or define means for sending an enablement signal, in response to receiving the wireless signal, to the controller to receive the release signal.

At block 406, the method 400 may receive the release signal. For example, the lock mechanism 280 may receive the release signal 166 via the lock antenna 292. The lock mechanism 280 and/or the lock antenna 292 may be configured to and/or define means for receiving the release signal.

At block 408, the method 400 may generate an unlocking signal, in response to receiving the release signal, for unlocking a lock mechanism of the security tag, wherein a first electrical energy of the unlocking signal is derived from at least a portion of a second electrical energy of the release signal. For example, the controller 290 may generate the unlocking signal 172 for unlocking the lock mechanism 280 of the security tag 104. The controller 290 may be configured to and/or define means for generating an unlocking signal, in response to receiving the release signal, for unlocking a lock mechanism of the security tag, wherein a first electrical energy of the unlocking signal is derived from at least a portion of a second electrical energy of the release signal.

At block 410, the method 400 may send an unlocking signal to the lock mechanism to detach the security tag from the merchandise. For example, the controller 290 may send the unlocking signal 172 to the lock mechanism 280 to detach the security tag 104 from the merchandise 102. The controller 290 may be configured to and/or define means for sending an unlocking signal to the lock mechanism to detach the security tag from the merchandise.

Figure 5:
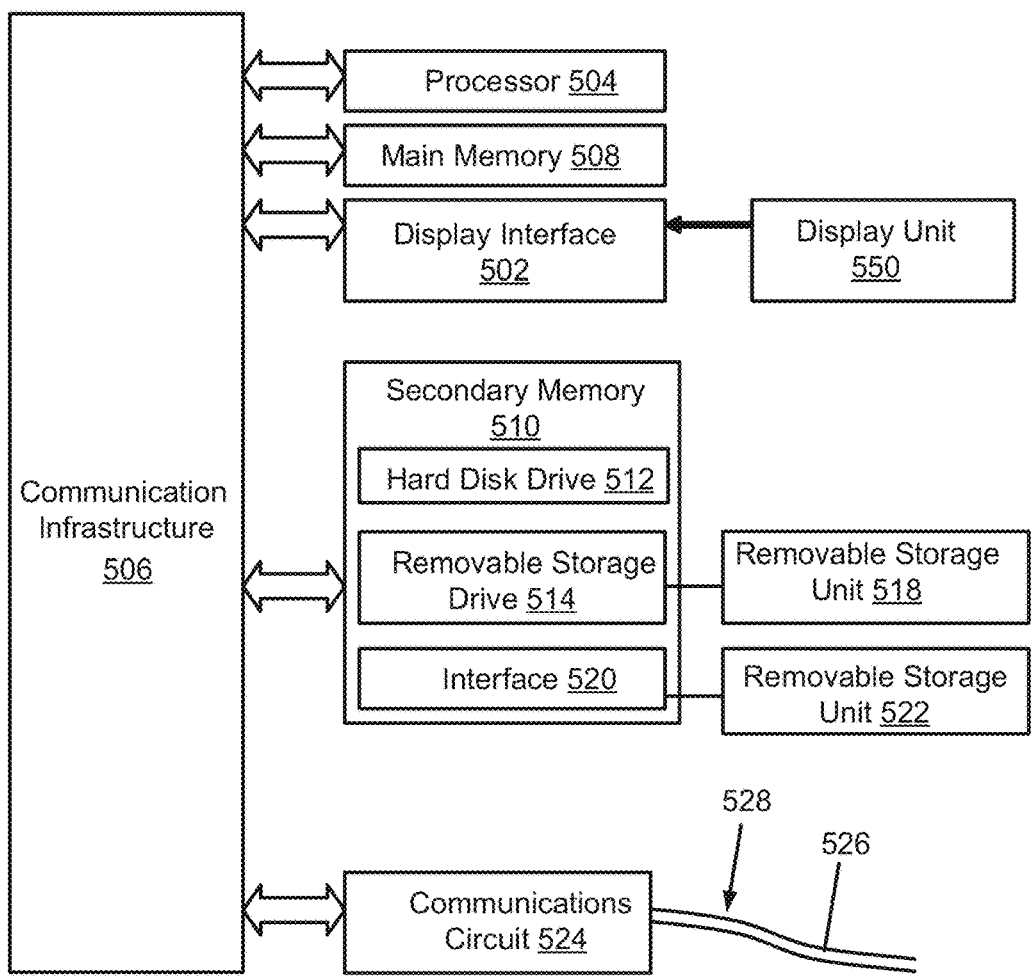
FIG. 5 illustrates an example of a computer system in accordance with aspects of the present disclosure.

Aspects of the present disclosures may be implemented using hardware, software, or a combination thereof and may be implemented in one or more computer systems or other processing systems. In an aspect of the present disclosures, features are directed toward one or more computer systems capable of carrying out the functionality described herein. An example of such the computer system 500 is shown in FIG. 5. In some examples, the RFID scanner 112 may be implemented as the computer system 500 shown in FIG. 5. The RFID scanner 112 may include some or all of the components of the computer system 500.

The computer system 500 includes one or more processors, such as processor 504. The processor 504 is connected with a communication infrastructure 506 (e.g., a communications bus, cross-over bar, or network). Various software aspects are described in terms of this example computer system. After reading this description, it will become apparent to a person skilled in the relevant art(s) how to implement aspects of the disclosures using other computer systems and/or architectures.

The computer system 500 may include a display interface 502 that forwards graphics, text, and other data from the communication infrastructure 506 (or from a frame buffer not shown) for display on a display unit 550. Computer system 500 also includes a main memory 508, preferably random access memory (RAM), and may also include a secondary memory 510. The secondary memory 510 may include, for example, a hard disk drive 512, and/or a removable storage drive 514, representing a floppy disk drive, a magnetic tape drive, an optical disk drive, a universal serial bus (USB) flash drive, etc. The removable storage drive 514 reads from and/or writes to a removable storage unit 518 in a well-known manner. Removable storage unit 518 represents a floppy disk, magnetic tape, optical disk, USB flash drive etc., which is read by and written to removable storage drive 514. As will be appreciated, the removable storage unit 518 includes a computer usable storage medium having stored therein computer software and/or data. In some examples, one or more of the main memory 508, the secondary memory 510, the removable storage unit 518, and/or the removable storage unit 522 may be a non-transitory memory.

Alternative aspects of the present disclosures may include secondary memory 510 and may include other similar devices for allowing computer programs or other instructions to be loaded into computer system 500. Such devices may include, for example, a removable storage unit 522 and an interface 520. Examples of such may include a program cartridge and cartridge interface (such as that found in video game devices), a removable memory chip (such as an erasable programmable read only memory (EPROM), or programmable read only memory (PROM)) and associated socket, and the removable storage unit 522 and the interface 520, which allow software and data to be transferred from the removable storage unit 522 to computer system 500.

Computer system 500 may also include a communications circuit 524. The communications circuit 524 may allow software and data to be transferred between computer system 500 and external devices. Examples of the communications circuit 524 may include a modem, a network interface (such as an Ethernet card), a communications port, a Personal Computer Memory Card International Association (PCMCIA) slot and card, etc. Software and data transferred via the communications circuit 524 are in the form of signals 528, which may be electronic, electromagnetic, optical or other signals capable of being received by the communications circuit 524. These signals 528 are provided to the communications circuit 524 via a communications path (e.g., channel) 526. This path 526 carries signals 528 and may be implemented using wire or cable, fiber optics, a telephone line, a cellular link, an RF link and/or other communications channels. In this document, the terms "computer program medium" and "computer usable medium" are used to refer generally to media such as the removable storage unit 518, a hard disk installed in hard disk drive 512, and signals 528. These computer program products provide software to the computer system 500. Aspects of the present disclosures are directed to such computer program products.

Computer programs (also referred to as computer control logic) are stored in main memory 508 and/or secondary memory 510. Computer programs may also be received via communications circuit 524. Such computer programs, when executed, enable the computer system 500 to perform the features in accordance with aspects of the present disclosures, as discussed herein. In particular, the computer programs, when executed, enable the processor 504 to perform the features in accordance with aspects of the present disclosures. Accordingly, such computer programs represent controllers of the computer system 500.

In an aspect of the present disclosures where the method is implemented using software, the software may be stored in a computer program product and loaded into computer system 500 using removable storage drive 514, hard disk drive 512, or the interface 520. The control logic (software), when executed by the processor 504, causes the processor 504 to perform the functions described herein. In another aspect of the present disclosures, the system is implemented primarily in hardware using, for example, hardware components, such as application specific integrated circuits (ASICs). Implementation of the hardware state machine so as to perform the functions described herein will be apparent to persons skilled in the relevant art(s).

Figure 6:
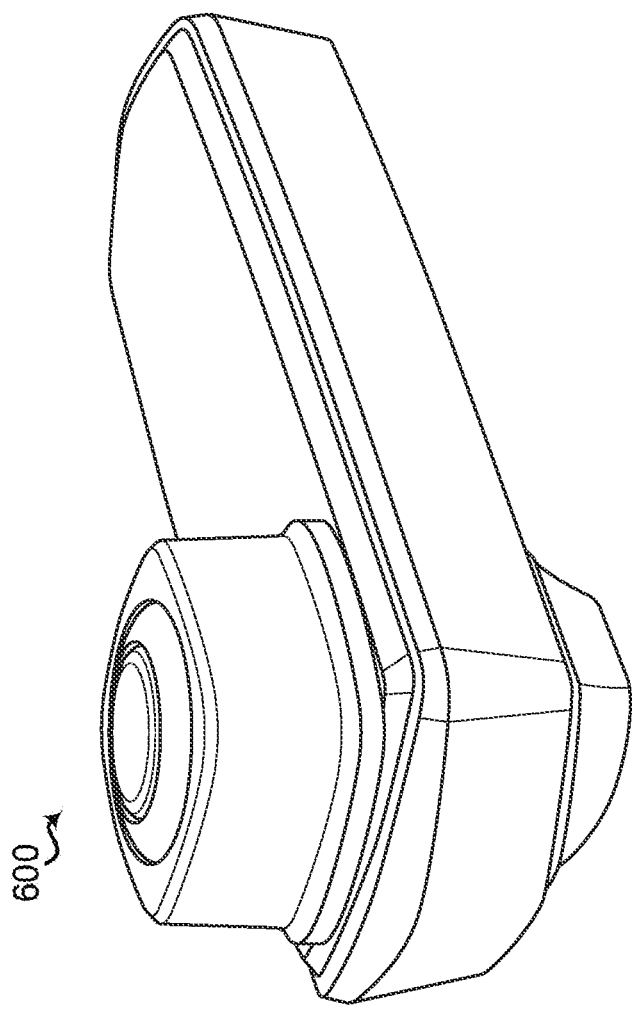
FIG. 6 illustrates an example of a security tag in a locked position in accordance with aspects of the present disclosure.
Figure 7:
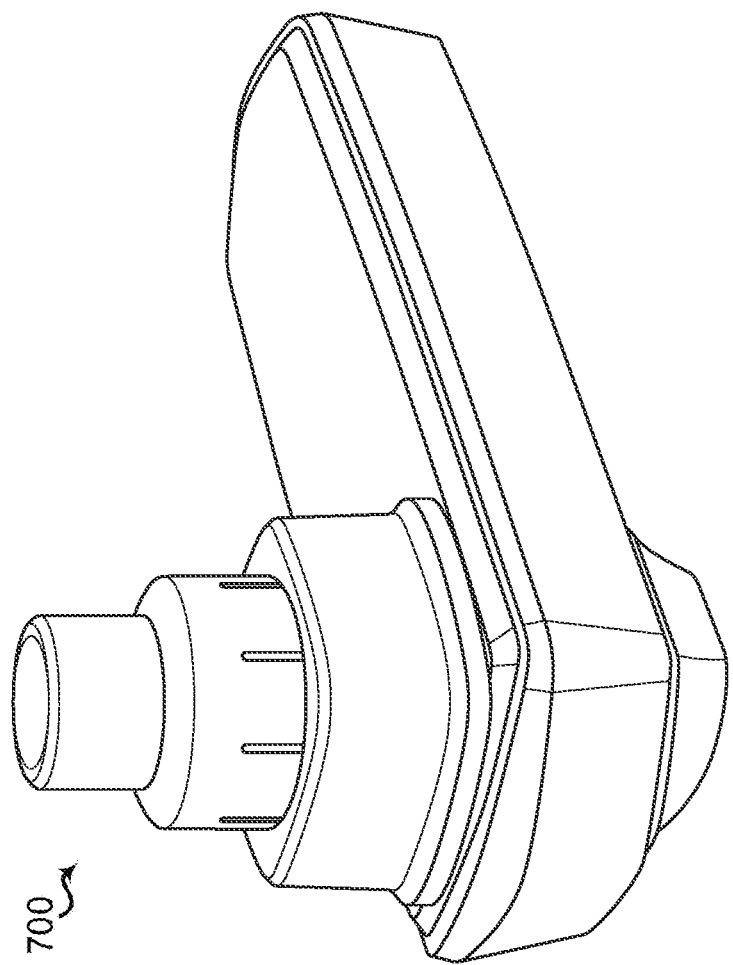
FIG. 7 illustrates an example of a security tag in an unlocked position in accordance with aspects of the present disclosure.

Referring to FIGS. 6 and 7, an example of the security tag 104 described herein may transition from a locked position 600 to an unlocked position 700 in response to receiving the RFID signal at the RFID device to unlock the security tag. For example, the security tag 104 may receive a wireless signal 164 to enable the RFID device 240 to receive the release signal 166. In response to the release signal 166, the security tag 104 may transition from the locked position 600 to the unlocked position 700.

Figure 8:
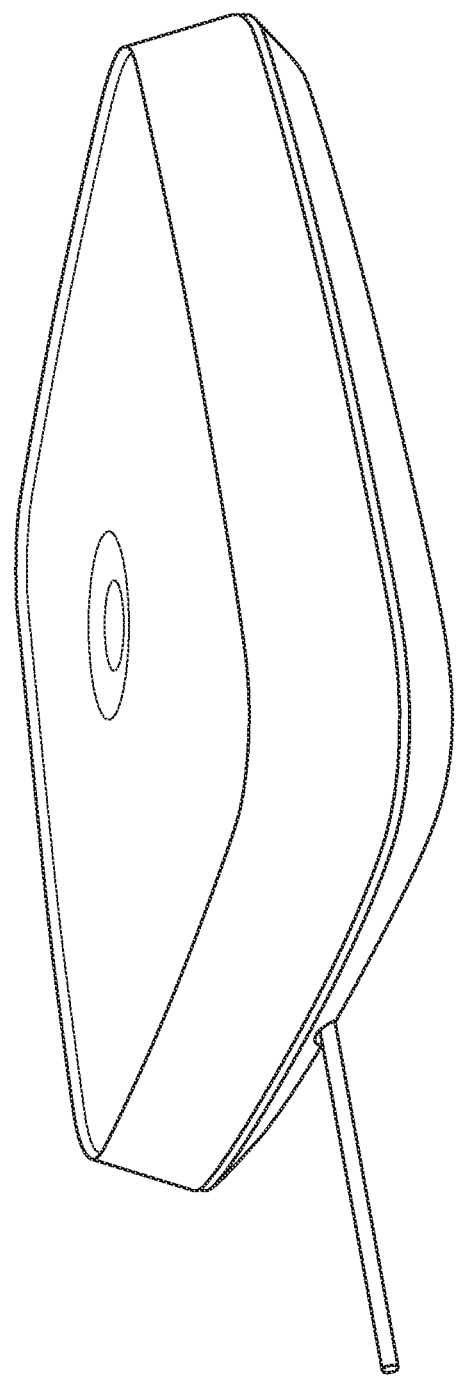
FIG. 8 illustrates an example of a RFID scanner in accordance with aspects of the present disclosure.
Figure 9:
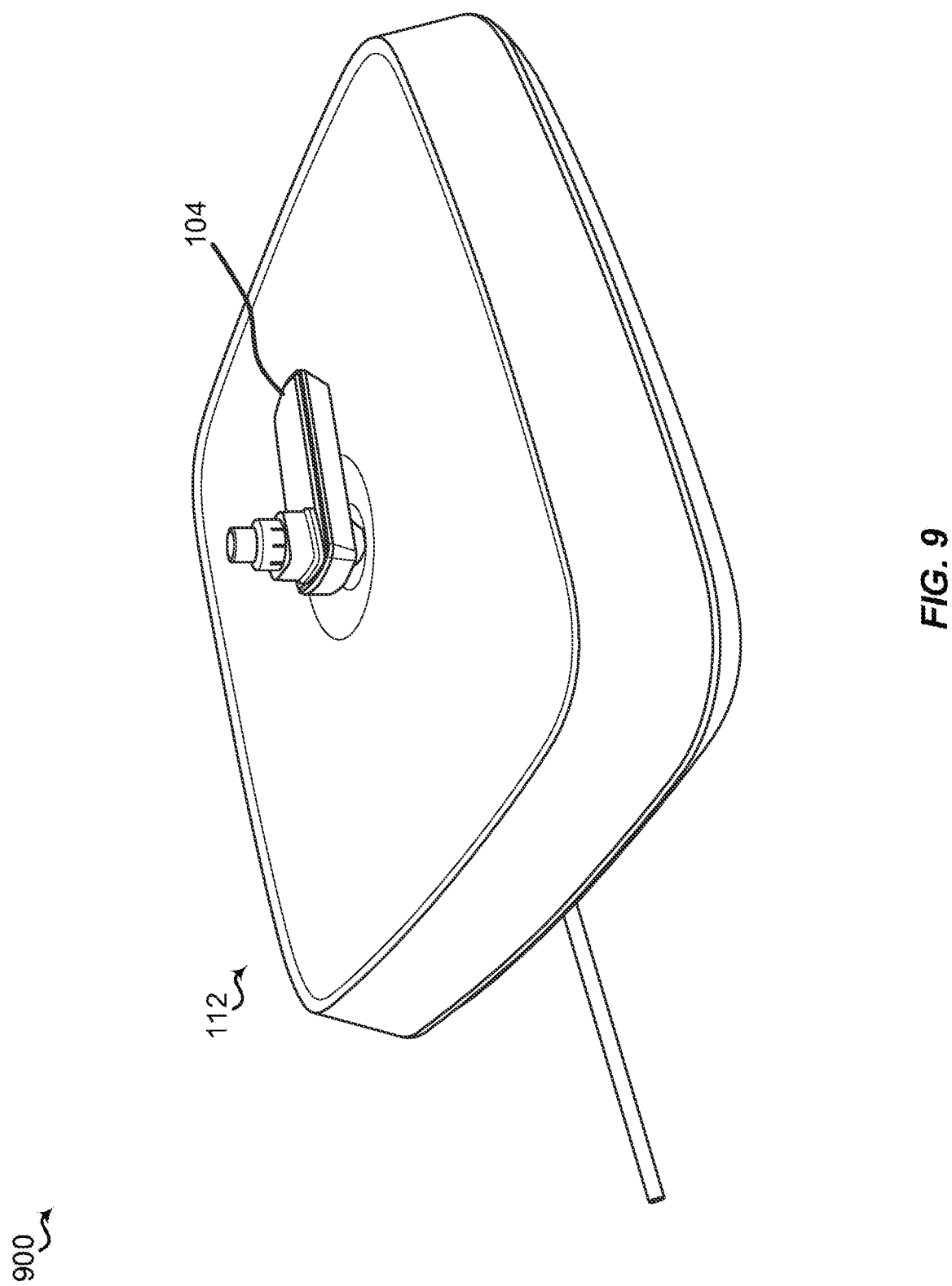
FIG. 9 illustrates an example of a system including a security tag and a RFID scanner in accordance with aspects of the present disclosure.

Referring to FIGS. 8 and 9, an example of the RFID scanner 112, and an example of a system 900 including the security tag 104 and the RFID scanner 112 represent one example implementation of the present disclosure.

Figure 10:
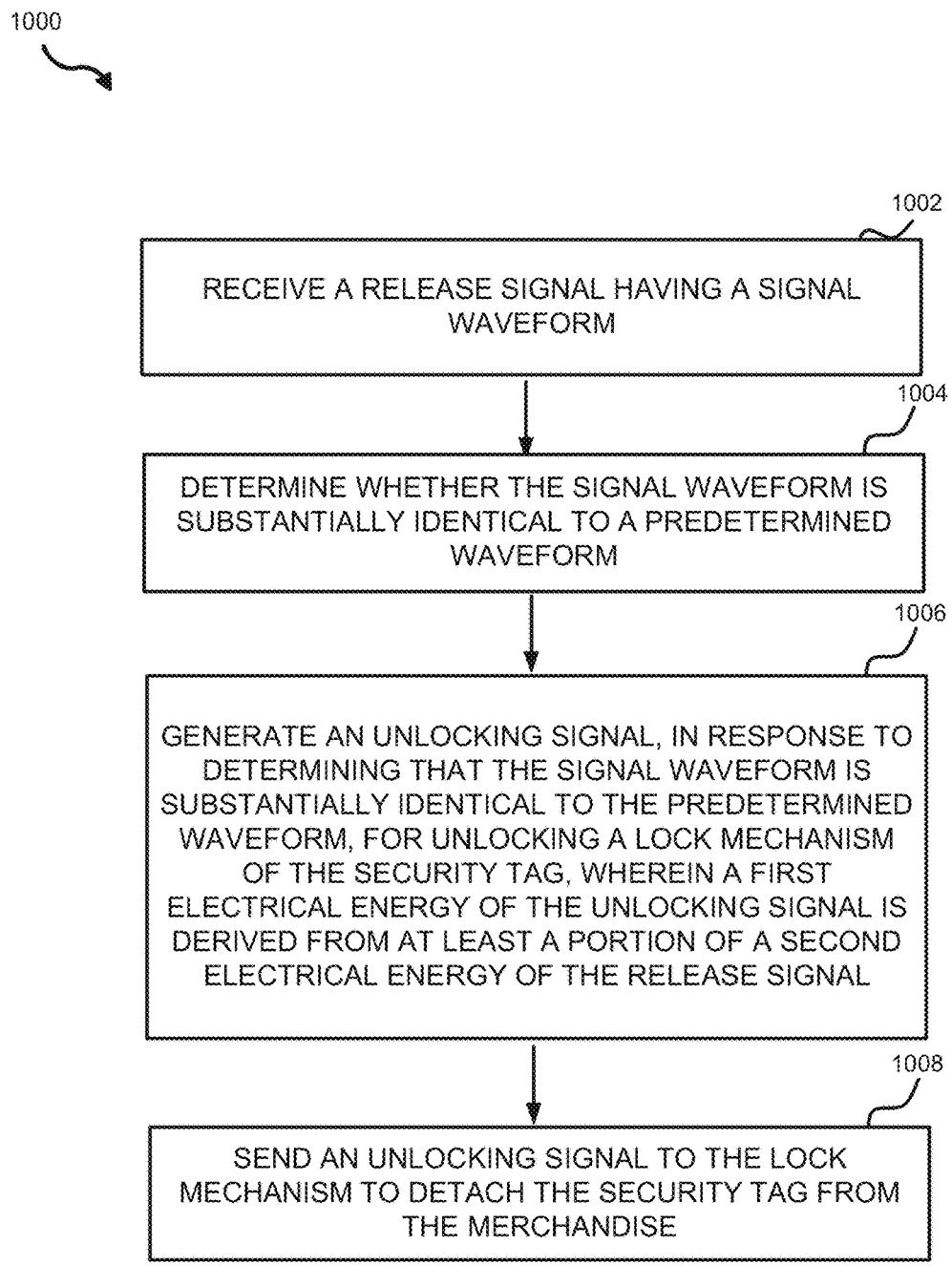
FIG. 10 illustrates an example of a method for removing a security tag in accordance with aspects of the present disclosure.

Referring to FIG. 10, an example of a method 1000 for receiving release signal energy to unlock a security tag may be performed by the controller 290.

At 1002, the method 1000 may receive a release signal having a signal waveform. For example, the lock mechanism 280 and/or the controller 290 may receive the release signal 166 via the lock antenna 292. The release signal 166 may have the waveform 167. The controller 290 and/or the lock antenna 292 may be configured to and/or define means for receiving the release signal having a waveform.

At 1004, the method 1000 may determine whether the signal waveform is substantially identical to a predetermined waveform. For example, the controller 290 may determine whether the waveform 167 is substantially identical to a predetermined waveform. The controller 290 may be configured to and/or define means for determining whether the signal waveform is substantially identical to a predetermined waveform.

At block 1006, the method 1000 may generate an unlocking signal, in response to determining that the signal waveform is substantially identical to the predetermined waveform, for unlocking a lock mechanism of the security tag, wherein a first electrical energy of the unlocking signal is derived from at least a portion of a second electrical energy of the release signal. For example, the controller 290 may generate the unlocking signal 172 for unlocking the lock mechanism 280 of the security tag 104. The controller 290 may be configured to and/or define means for generating an unlocking signal, in response to determining that the signal waveform is substantially identical to the predetermined waveform, for unlocking a lock mechanism of the security tag, wherein a first electrical energy of the unlocking signal is derived from at least a portion of a second electrical energy of the release signal.

At block 1008, the method 1000 may send an unlocking signal to the lock mechanism to detach the security tag from the merchandise. For example, the controller 290 may send the unlocking signal 172 to the lock mechanism 280 to detach the security tag 104 from the merchandise 102. The controller 290 may be configured to and/or define means for sending an unlocking signal to the lock mechanism to detach the security tag from the merchandise.

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A method of unlocking a security tag by a scanner, comprising:
   receiving a confirmation signal to unlock the security tag being detachably locked to a merchandise, wherein the confirmation signal includes a RFID device identifier associated with a RFID device of the security tag, and the RFID device is associated with a wireless device of the security tag;
   identifying the wireless device associated with the RFID device based on the RFID device identifier;
   transmitting, from the scanner to the RFID device, a wireless signal to the wireless device to enable a controller of the RFID device to receive a release signal used to unlock the security tag from the merchandise, wherein the controller is unable to receive the release signal without receiving the wireless signal beforehand; and
   transmitting, from the scanner to the RFID device after the transmission of the wireless signal, the release signal to the controller to unlock the security tag from the merchandise, wherein the release signal is different from the wireless signal.

2. The method of claim 1, wherein the wireless signal is a Bluetooth signal, a Wireless Fidelity signal, or a Near-Field Communication signal.

3. The method of claim 1, wherein identifying the wireless device comprises:
   transmitting the RFID device identifier to a server storing an association between the wireless device and the RFID device; and
   receiving a wireless device identifier associated with the wireless device, wherein the wireless device identifier is associated with the RFID device identifier.

4. The method of claim 3, wherein the wireless device identifier is one of a hardware address of the wireless device or a portion of a hardware address of the wireless device, and the RFID device identifier is one of a hardware address of the RFID device or a portion of the hardware address of the RFID device.

5. The method of claim 1, wherein at least a portion of an energy of the release signal is used to generate an unlocking signal for unlocking the security tag.

6. The method of claim 1, wherein the wireless signal is encrypted.

7. A scanner, comprising:
   a release signal transmitter; a transceiver;
   memory that stores instructions; and
   a processor configured to execute the instructions to:
      receive a confirmation signal to unlock a security tag being detachably locked to a merchandise, wherein the confirmation signal includes a radio frequency identification (RFID) device identifier associated with a RFID device of the security tag and the RFID device is associated with a wireless device of the security tag;
      identify the wireless device associated with the RFID device based on the RFID device identifier;
      cause the transceiver to transmit, from the scanner to the RFID device, a wireless signal to the wireless device to enable a controller of the RFID device to receive a release signal used to unlock the security tag from the merchandise, wherein the controller is unable to receive the release signal without receiving the wireless signal beforehand; and
      cause the release signal transmitter to transmit, from the scanner to the RFID device after the transmission of the wireless signal, the release signal to the controller to unlock the security tag from the merchandise, wherein the release signal is different from the wireless signal.

8. The scanner of claim 7, wherein the wireless signal is a Bluetooth signal, a Wireless Fidelity signal, or a Near-Field Communication signal.

9. The scanner of claim 7, wherein to identify the wireless device the processor is configured to:
   transmit the RFID device identifier to a server storing an association between the wireless device and the RFID device; and receive a wireless device identifier associated with the wireless device, wherein the wireless device identifier is associated with the RFID device identifier.

10. The scanner of claim 9, wherein the wireless device identifier is one of a hardware address of the wireless device or a portion of a hardware address of the wireless device, and the RFID device identifier is one of a hardware address of the RFID device or a portion of the hardware address of the RFID device.

11. The scanner of claim 7, wherein at least a portion of an energy of the release signal is used to generate an unlocking signal for unlocking the security tag.

12. The scanner of claim 7, wherein the wireless signal is encrypted.

13. A method by a security tag, comprising:
receiving a wireless signal transmitted by a scanner to enable a controller of the security tag to receive a release signal used to detach the security tag from a merchandise, wherein the controller is unable to receive the release signal without receiving the wireless signal beforehand;
sending an enablement signal, in response to receiving the wireless signal, to the controller to receive the release signal;
receiving the release signal transmitted by the scanner after the reception of the wireless signal, wherein the release signal is different from the wireless signal;
generating an unlocking signal, in response to receiving the release signal, for unlocking a lock mechanism of the security tag, wherein a first electrical energy of the unlocking signal is derived from at least a portion of a second electrical energy of the release signal; and
sending an unlocking signal to the lock mechanism to detach the security tag from the merchandise.

14. The method of claim 13, wherein the wireless signal is a Bluetooth signal, a Wireless Fidelity signal, or a Near-Field Communication signal.

15. The method of claim 13, wherein the wireless signal is encrypted.

16. A security tag, comprising:
a wireless device configured to:
receive a wireless signal transmitted by a scanner to enable a controller of the security tag to receive a release signal used to detach the security tag from a merchandise, wherein the controller is unable to receive the release signal without receiving the wireless signal beforehand; and
send an enablement signal, in response to receiving the wireless signal, to the controller to receive the release signal;
the controller configured to:
receive the release signal transmitted by the scanner after the reception of the wireless signal, wherein the release signal is different from the wireless signal;
generate an unlocking signal, in response to receiving the release signal, for unlocking a lock mechanism of the security tag, wherein a first electrical energy of the unlocking signal is derived from at least a portion of a second electrical energy of the release signal; and
send an unlocking signal to the lock mechanism to detach the security tag from the merchandise; and
the lock mechanism configured to unlock in response to receiving the unlocking signal.

17. The security tag of claim 16, wherein the wireless device is a Bluetooth device, a Wireless Fidelity device, or a Near-Field Communications device.

18. The security tag of claim 16, wherein the wireless signal is encrypted.

19. A method by a security tag, comprising:
receiving a release signal transmitted by a scanner having a signal waveform;
determining whether the signal waveform is substantially identical to a predetermined waveform;
generating an unlocking signal, in response to determining that the signal waveform is substantially identical to the predetermined waveform, for unlocking a lock mechanism of the security tag, wherein a first electrical energy of the unlocking signal is derived from at least a portion of a second electrical energy of the release signal; and
sending an unlocking signal to the lock mechanism to detach the security tag from the merchandise.

* * * * *